(12) United States Patent
Itou et al.

(10) Patent No.: US 9,162,213 B2
(45) Date of Patent: Oct. 20, 2015

(54) PRODUCTION METHOD FOR EXHAUST GAS-PURIFYING CATALYST AND MOTOR VEHICLE

(75) Inventors: Yutaka Itou, Shizuoka (JP); Naohiro Morozumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 176 days.

(21) Appl. No.: 13/883,634

(22) PCT Filed: Nov. 25, 2011

(86) PCT No.: PCT/JP2011/077167
§ 371 (c)(1),
(2), (4) Date: May 6, 2013

(87) PCT Pub. No.: WO2012/077510
PCT Pub. Date: Jun. 14, 2012

(65) Prior Publication Data
US 2013/0239556 A1  Sep. 19, 2013

(30) Foreign Application Priority Data

Dec. 6, 2010 (JP) ................. 2010-271266

(51) Int. Cl.
*B01D 53/86* (2006.01)
*B01D 53/94* (2006.01)
(Continued)

(52) U.S. Cl.
CPC ............. *B01J 23/63* (2013.01); *B01J 21/066* (2013.01); *B01J 23/464* (2013.01); *B01J 35/0066* (2013.01); *B01J 37/0213* (2013.01); *B01J 37/0248* (2013.01); *B01J 37/035* (2013.01);
(Continued)

(58) Field of Classification Search
USPC ......... 423/213.2, 213.5, 239.1; 502/302–305, 502/200, 439, 87, 240–242
See application file for complete search history.

(56) References Cited

U.S. PATENT DOCUMENTS

2007/0129246 A1  6/2007  Miura
2008/0242533 A1  10/2008  Saito

FOREIGN PATENT DOCUMENTS

JP      01-115458 A    5/1989
JP    2001-079399 A    3/2001
(Continued)

OTHER PUBLICATIONS

Official Communication issued in International Patent Application No. PCT/JP2011/077167, mailed on Feb. 28, 2012.
(Continued)

*Primary Examiner* — Kenneth Bomberg
*Assistant Examiner* — Dapinder Singh
(74) *Attorney, Agent, or Firm* — Keating & Bennett, LLP

(57) ABSTRACT

A method for producing an exhaust gas purifying catalyst according to the present invention includes step (a) of preparing a metal oxide support containing zirconium; step (b) of preparing a solution containing rhodium; and step (c) of adding the metal oxide support prepared in the step (a), and ammonium carbonate, ammonium hydrogencarbonate or ammonia water, to the solution prepared in the step (b) to obtain the solution having a pH adjusted to a range of 3.0 or higher and 7.5 or lower. The present invention provides a method capable of producing an exhaust gas purifying catalyst including a metal oxide support containing zirconium and rhodium of a minute particle size which is supported on the metal oxide support at a high degree of dispersion.

10 Claims, 6 Drawing Sheets

(51) Int. Cl.
  *B01J 23/58* (2006.01)
  *B01J 32/00* (2006.01)
  *B01J 35/10* (2006.01)
  *B01J 37/02* (2006.01)
  *B01J 23/63* (2006.01)
  *B01J 21/06* (2006.01)
  *B01J 23/46* (2006.01)
  *B01J 35/00* (2006.01)
  *B01J 37/03* (2006.01)
  *F01N 3/28* (2006.01)

(52) U.S. Cl.
  CPC . *F01N 3/28* (2013.01); *B01D 53/94* (2013.01); *B01D 2255/1025* (2013.01); *B01D 2255/2063* (2013.01); *B01D 2255/2065* (2013.01); *B01D 2255/2068* (2013.01); *B01D 2255/20715* (2013.01); *F01N 3/2828* (2013.01); *F01N 2590/04* (2013.01)

(56) References Cited

FOREIGN PATENT DOCUMENTS

| | | |
|---|---|---|
| JP | 2002-001119 A | 1/2002 |
| JP | 2002-191989 A | 7/2002 |
| JP | 2005-081183 A | 3/2005 |
| JP | 2005-270883 A | 10/2005 |
| JP | 2005-313028 A | 11/2005 |
| JP | 2006-068665 A | 3/2006 |
| JP | 2006-320863 A | 11/2006 |
| JP | 2007-029778 A | 2/2007 |
| JP | 2008-284553 A | 11/2008 |
| JP | 2009-183895 A | 8/2009 |
| WO | 2006/025613 A1 | 3/2006 |

OTHER PUBLICATIONS

Official Communication issued in corresponding European Patent Application No. 11846734.9, mailed on Jun. 11, 2014.

PRODUCTION METHOD FOR EXHAUST GAS-PURIFYING CATALYST AND MOTOR VEHICLE

TECHNICAL FIELD

The present invention relates to a method for producing an exhaust gas purifying catalyst, and specifically to a method for producing an exhaust gas purifying catalyst including a metal oxide support containing zirconium and rhodium supported thereon. The present invention also relates to a motor vehicle including an exhaust gas purifying catalyst produced by such a production method.

BACKGROUND ART

In order to purify combustion gas (exhaust gas) discharged from an internal combustion engine of a motor vehicle, three-way catalysts are widely used. A three-way catalyst reduces or oxidizes CO (carbon monoxide), HC (hydrocarbon) and $NO_x$ (oxide of nitrogen) contained in exhaust gas into water, carbon dioxide and nitrogen to purify the exhaust gas. Such a three-way catalyst includes a support formed of a metal oxide (metal oxide support), and a noble metal material such as platinum (Pt), rhodium (Rh), palladium (Pd) or the like supported on the support.

As the metal oxide support, it is conventionally common to use alumina ($Al_2O_3$) in order to provide a relatively large specific surface area. However, it has recently been proposed to use a metal oxide other than alumina such as ceria ($CeO_2$), zirconia ($ZrO_2$), titania ($TiO_2$) or the like in stead of, or in combination with, alumina in order to utilize chemical characteristics of the metal oxide support to further improve the purification performance.

Studies are also made on preferable combinations (chemistry) of a metal oxide support and a noble metal material. It has been reported that rhodium, when used in combination with a metal oxide containing zirconia as a main component (zirconia or zirconia-based complex oxide), provides superb purification performance.

When rhodium is supported by alumina, which is conventionally used commonly, rhodium is dissolved into alumina as time passes, and this decreases the catalyst activity. By contrast, when rhodium is supported by a metal oxide containing zirconia as a main component, rhodium is not dissolved. Therefore, the high catalyst activity which rhodium originally has can be utilized.

However, it is difficult to cause a metal oxide containing zirconia as a main component to adsorb and thus support rhodium. When a metal oxide containing zirconia as a main component is merely mixed in a commercially available aqueous solution of rhodium, rhodium is not adsorbed to the metal oxide support almost at all.

Patent Documents 1 and 2 each disclose a technique for causing a metal oxide containing zirconia as a main component to support rhodium.

According to the technique disclosed in Patent Document 1, zirconia is added to an aqueous solution of rhodium nitrate and the resultant solution is evaporated to dryness, so as to cause zirconia to support rhodium. According to the technique disclosed in Patent Document 2, a metal oxide containing zirconia as a main component is immersed in a colloidal solution containing rhodium, so as to cause the metal oxide support to support colloidal rhodium.

CITATION LIST

Patent Literature

Patent Document 1: Japanese Laid-Open Patent Publication No. 2006-320863
Patent Document 2: Japanese Laid-Open Patent Publication No. 2008-284553

SUMMARY OF INVENTION

Technical Problem

However, with the technique of Patent Document 1, rhodium aggregates during evaporation to dryness, which decreases the degree of dispersion of rhodium. With the technique of Patent Document 2, it is difficult to decrease the size of the supported rhodium particles to a sufficiently small level because it is difficult to make colloidal particles of rhodium minute. When the degree of dispersion of rhodium is low or the size of the rhodium particles is large, the number of rhodium atoms actually contacting exhaust gas on a surface of the catalyst is small, and therefore, a sufficiently high level of purification performance cannot be provided.

The present invention made in light of this problem has an object of providing a method capable of producing an exhaust gas purifying catalyst including a metal oxide support containing zirconium (Zr) and rhodium of a minute particle size which is supported on the metal oxide support at a high degree of dispersion.

Solution to Problem

A method for producing an exhaust gas purifying catalyst according to the present invention includes step (a) of preparing a metal oxide support containing zirconium; step (b) of preparing a solution containing rhodium; and step (c) of adding the metal oxide support, and ammonium carbonate or ammonium hydrogencarbonate or ammonia water, to the solution to obtain the solution having a pH adjusted to a range of 3.0 or higher and 7.5 or lower.

In a preferable embodiment, the step (c) includes step (c-1A) of mixing the metal oxide support in the solution; and step (c-2A) of adding ammonium carbonate, ammonium hydrogencarbonate or ammonia water to the solution after the step (c-1A) to adjust the pH of the solution to a range of 3.0 or higher and 7.5 or lower.

In a preferable embodiment, the step (c) includes step (c-1B) of adding ammonium carbonate, ammonium hydrogencarbonate or ammonia water to the solution to adjust the pH of the solution to a prescribed range; and step (c-2B) of mixing the metal oxide support in the solution after the step (c-1B). The prescribed range in the step (c-1B) is set such that the pH of the solution becomes a value in a range of 3.0 or higher and 7.5 or lower after the step (c-2B) is performed.

In a preferable embodiment, the pH of the solution obtained in the step (c) is in a range of 4.0 or higher and 6.5 or lower.

In a preferable embodiment, the metal oxide support prepared in the step (a) contains zirconium in a range of 50 mol % or higher and 95 mol % or lower as being converted into an oxide.

In a preferable embodiment, the metal oxide support prepared in the step (a) contains zirconium in a range of 70 mol % or higher and 90 mol % or lower as being converted into an oxide.

In a preferable embodiment, the metal oxide support prepared in the step (a) contains at least one metal material selected from the group consisting of cerium, lanthanum and neodymium.

In a preferable embodiment, the solution prepared in the step (b) has an absorbance of 0.8 or less for a ray having a wavelength of 300 nm.

In a preferable embodiment, the solution prepared in the step (b) has a chlorine content of 1000 ppm or less.

In a preferable embodiment, the method for producing an exhaust gas purifying catalyst according to the present invention further includes step (d) of drying and burning the solution after the step (c) to obtain catalyst powder containing the metal oxide support and rhodium supported thereon.

In a preferable embodiment, the method for producing an exhaust gas purifying catalyst according to the present invention further includes step (e) of forming a catalyst layer by use of the catalyst powder on a surface of a honeycomb-like substrate.

A motor vehicle according to the present invention includes an internal combustion engine; an exhaust pipe for guiding exhaust gas from the internal combustion engine to outside; and the exhaust gas purifying catalyst produced by the above-described method for producing an exhaust gas purifying catalyst and provided in the exhaust pipe.

Hereinafter, the function of the present invention will be described.

The method for producing an exhaust gas purifying catalyst according to the present invention includes step (a) of preparing a metal oxide support containing zirconium; and step (b) of preparing a solution containing rhodium. The production method according to the present invention further includes step (c) of adding the metal oxide support prepared in the step (a), and ammonium carbonate, ammonium hydrogencarbonate or ammonia water, to the solution prepared in the step (b) to obtain the solution having a pH adjusted to a range of 3.0 or higher and 7.5 or lower. When the pH of the solution obtained in the step (c) is in a range of 3.0 or higher and 7.5 or lower, the degree of adsorption of rhodium to the metal oxide support containing zirconium can be increased. Therefore, it is not necessary to cause rhodium which has not been adsorbed to be supported on the metal oxide support semi-forcibly by evaporation to dryness or to make rhodium colloidal. Thus, rhodium of a minute particle size can be supported on the metal oxide support containing zirconium at a high degree of dispersion. For this reason, according to the present invention, the level of purification performance of the exhaust gas purifying catalyst can be raised. In addition, in the production method according to the present invention, ammonium carbonate, ammonium hydrogencarbonate or ammonia water is used instead of a mere alkaline compound. Owing to this, the degree of dispersion of rhodium after the catalyst is exposed to a high temperature can be kept higher than in the case where any other alkaline compound is used. Therefore, the catalyst produced by the production method according to the present invention is highly durable and thus is preferably usable as an exhaust gas purifying catalyst, which is exposed to high-temperature exhaust gas.

The step (c) includes, for example, step (c-1A) of mixing the metal oxide support in the solution; and step (c-2A) of adding ammonium carbonate, ammonium hydrogencarbonate or ammonia water to the solution after the step (c-1A) to adjust the pH of the solution to a range of 3.0 or higher and 7.5 or lower. When the pH is adjusted after the metal oxide support is mixed in the solution in this manner, there is an advantage that rhodium can be dispersed more uniformly.

Alternatively, the step (c) includes step (c-1B) of adding ammonium carbonate, ammonium hydrogencarbonate or ammonia water to the solution to adjust the pH of the solution to a prescribed range; and step (c-2B) of mixing the metal oxide support in the solution after the step (c-1B). In this case, the prescribed range in the step (c-1B) is set such that the pH of the solution becomes a value in a range of 3.0 or higher and 7.5 or lower after the step (c-2B) is performed. When the pH is adjusted before the metal oxide support is mixed in the solution in this manner, there is an advantage that a metal oxide support containing a component which is easily soluble in acid can be used.

It is preferable that the pH of the solution obtained in the step (c) is in a range of 4.0 or higher and 6.5 or lower. When the pH of the solution is in a range of 4.0 or higher and 6.5 or lower, the degree of adsorption of rhodium can be further increased.

In order to allow the catalyst activity of rhodium to be exhibited sufficiently, it is preferable that the metal oxide support prepared in the step (a) contains zirconium in a range of 50 mol % or higher and 95 mol % or lower as being converted into an oxide. Namely, it is preferable that the ratio of zirconia with respect to the metal oxide support is in a range of 50 mol % or higher and 95 mol % or lower. When the ratio of zirconia with respect to the metal oxide support is in a range of 50 mol % or higher and 95 mol % or lower, the $NO_x$ purification ratio realized by the resultant catalyst can be raised.

In order to allow the catalyst activity of rhodium to be exhibited sufficiently, it is more preferable that the metal oxide support prepared in the step (a) contains zirconium in a range of 70 mol % or higher and 90 mol % or lower as being converted into an oxide. Namely, it is more preferable that the ratio of zirconia with respect to the metal oxide support is in a range of 70 mol % or higher and 90 mol % or lower. When the ratio of zirconia with respect to the metal oxide support is in a range of 70 mol % or higher and 90 mol % or lower, the $NO_x$ purification ratio realized by the resultant catalyst can be further raised.

It is preferable that the metal oxide support prepared in the step (a) contains at least one metal material selected from the group consisting of cerium, lanthanum and neodymium. Namely, it is preferable that the metal oxide support is a zirconia-based complex oxide than being formed only of zirconia. When the metal oxide support contains cerium, the metal oxide support can absorb oxygen in the atmosphere. This raises the $NO_x$ purification ratio. When the metal oxide support contains lanthanum, the surface area of the complex oxide is increased. This raises the $NO_x$ purification ratio. When the metal oxide support contains neodymium, the aggregation of rhodium can be suppressed. This raises the $NO_x$ purification ratio.

It is preferable that the solution prepared in the step (b) has an absorbance of 0.8 or less for a ray having a wavelength of 300 nm. According to the studies performed by the present inventors, when the absorbance for the ray having a wavelength of 300 nm is 0.8 or less, the degree of dispersion of rhodium can be increased as compared with when the absorbance for the ray having a wavelength of 300 nm exceeds 0.8. A conceivable reason for this is that the state of rhodium ions in the solution influences the degree of dispersion.

It is preferable that the solution prepared in the step (b) has a chlorine content of 1000 ppm or less. Chlorine causes the catalyst to be poisoned. Therefore, when the chlorine content of the solution exceeds 1000 ppm, a step of removing chlorine is required after rhodium is supported. By preparing a solution having a chlorine content of 1000 ppm or less, such a step becomes unnecessary. Thus, the production cost can be decreased and the time duration required for the production can be shortened.

The method for producing an exhaust gas purifying catalyst according to the present invention, typically, further includes step (d) of drying and burning the solution after the step (c) to obtain catalyst powder containing the metal oxide support and rhodium supported thereon. In the production method according to the present invention, the pH of the solution obtained in the step (c) is in a range of 3.0 or higher and 7.5 or lower. Therefore, in the catalyst powder obtained in the step (d), rhodium of a minute particle size can be supported on the metal oxide support at a high degree of dispersion.

The method for producing an exhaust gas purifying catalyst according to the present invention, typically, further includes step (e) of forming a catalyst layer by use of the catalyst powder on a surface of a honeycomb-like substrate. A honeycomb-like substrate has a large specific surface area. Therefore, by forming the catalyst layer on the surface of the honeycomb-like substrate, a surface area in which the exhaust gas and rhodium contact each other can be increased, and thus the exhaust gas purifying catalyst functions in a preferable manner.

A motor vehicle according to the present invention includes the exhaust gas purifying catalyst produced by the production method according to the present invention, and providing a high level of purification performance and having a high durability, and therefore can decrease the emission of $NO_x$ or the like.

Advantageous Effects of Invention

The present invention provides a method capable of producing an exhaust gas purifying catalyst including a metal oxide support containing zirconium and rhodium of a minute particle size which is supported on the metal oxide support at a high degree of dispersion.

DESCRIPTION OF EMBODIMENTS

Hereinafter, embodiments of the present invention will be described with reference to the drawings. The present invention is not limited to the following embodiment.

Figure 1:
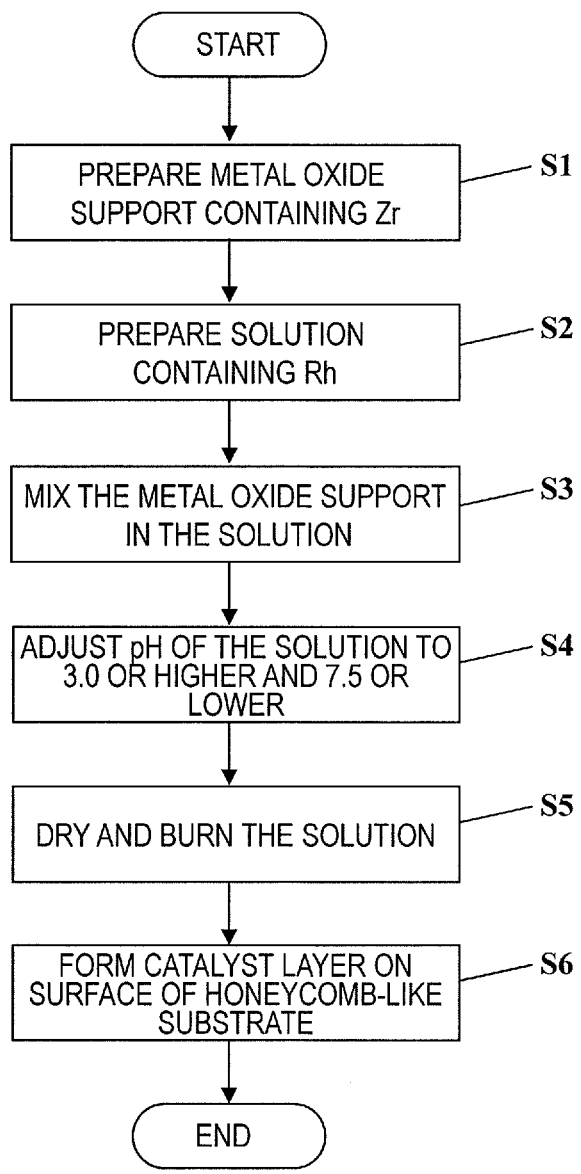
FIG. 1 is a flowchart of a method for producing an exhaust gas purifying catalyst in a preferable embodiment according to the present invention.

First, with reference to FIG. 1, a method for producing an exhaust gas purifying catalyst in this embodiment will be described. FIG. 1 is a flowchart of a production method in this embodiment.

First, a metal oxide support containing zirconium (Zr) is prepared (step S1). The metal oxide support prepared in step S1 is, specifically, zirconia ($ZrO_2$) or a zirconia-based complex oxide (i.e., metal oxide also containing a metal element other than zirconium).

Next, a solution containing rhodium (Rh) (rhodium solution) is prepared (step S2). The rhodium solution prepared in step S2 is acidic (i.e., having a pH less than 7), and is typically an aqueous solution of a rhodium salt. Examples of the aqueous solution of a rhodium salt include an aqueous solution of rhodium nitrate and an aqueous solution of hexaammine rhodium. In FIG. 1, step S2 of preparing a rhodium solution is performed after step S1 of preparing a metal oxide support. The order of step S1 and step S2 is not limited to this. Step S1 and step S2 may be performed in any order.

Next, the metal oxide support is mixed in the rhodium solution (step S3). For example, powder of the metal oxide support is added to the rhodium solution.

Next, the pH of the rhodium solution in which the metal oxide support is mixed is adjusted to a range of 3.0 or higher and 7.5 or lower (step S4). Step S4 is specifically performed by adding ammonium carbonate, ammonium hydrogencarbonate or ammonia water to the rhodium solution. Typically, the rhodium solution, after being mixed with the above-mentioned alkaline compound, is stirred by a stirrer or the like, and then left at a prescribed temperature (e.g., 60° C.) for a prescribed time duration (e.g., 1 hour to 5 hours). As a result of step S4, rhodium is adsorbed to the metal oxide support containing zirconium.

Next, the rhodium solution is dried and burned (step S5). As a result, catalyst powder containing the metal oxide support and rhodium supported thereon is obtained. The drying operation is performed, for example, at 120° C. for 300 minutes. The burning operation is performed, for example, at 600° C. for 60 minutes.

Then, a catalyst layer is formed by use of the catalyst powder on a surface of a honeycomb-like substrate (step S6). The substrate is formed of a heat-resistant material such as a metal or ceramic material. The substrate has therein a great number of cells defined by ribs. The catalyst layer is formed on the surface of the substrate as follows. First, the catalyst powder is mixed with a binder and water, and the resultant mixture is pulverized to form a slurry. The binder is added in order to prevent the catalyst layer from being delaminated from the substrate. Materials usable as the binder include boehmite (hydrate of alumina) and aluminum nitrate. In the process of forming the slurry, it is preferable to adjust the pH of the slurry to a range of 3 to 5 in order to stabilize the slurry.

Next, the slurry is applied to the surface of the substrate, and then dried and burned. In this manner, an exhaust gas purifying catalyst can be produced.

As described above, the production method in this embodiment includes step S4 of adding ammonium carbonate, ammonium hydrogencarbonate or ammonia water to the rhodium solution in which the metal oxide support is mixed and thus adjusting the pH of the rhodium solution to a range of 3.0 or higher and 7.5 or lower. Since the pH of the rhodium solution is adjusted to a range of 3.0 or higher and 7.5 or lower in step S4, the degree of adsorption of rhodium to the metal oxide support containing zirconium can be increased as shown by inspection results later. Therefore, it is not necessary to cause rhodium which has not been adsorbed to be supported on the metal oxide support semi-forcibly by evaporation to dryness as described in Patent Document 1. It is not necessary either to make rhodium colloidal as described in Patent Document 2. Thus, rhodium of a minute particle size can be supported on the metal oxide support containing zirconium at a high degree of dispersion. For this reason, according to the production method in this embodiment, the level of purification performance of the exhaust gas purifying catalyst can be raised.

According to the production method in this embodiment, in step S4, ammonium carbonate, ammonium hydrogencarbonate or ammonia water is used instead of a mere alkaline compound. Owing to this, as shown by inspection results later, the degree of dispersion of rhodium after the catalyst is exposed to a high temperature can be kept higher than in the case where any other alkaline compound is used. Therefore, the catalyst produced by the production method in this embodiment is highly durable and thus is preferably usable as an exhaust gas purifying catalyst, which is exposed to high-temperature exhaust gas.

Ammonium carbonate and ammonium hydrogencarbonate are easier to handle than ammonia water. Therefore, in step S4, it is preferable to add ammonium carbonate or ammonium hydrogencarbonate to the rhodium solution.

In step S4, it is preferable that the pH of the rhodium solution is adjusted to a range of 4.0 or higher and 6.5 or lower. When the pH of the rhodium solution is adjusted to a range of 4.0 or higher and 6.5 or lower, the degree of adsorption of rhodium can be further increased.

In order to allow the catalyst activity of rhodium to be exhibited sufficiently, it is preferable that the metal oxide support prepared in step S1 contains zirconium in a range of 50 mol % or higher and 95 mol % or lower as being converted into an oxide. Namely, it is preferable that the ratio of zirconia with respect to the metal oxide support is in a range of 50 mol % or higher and 95 mol % or lower. When the ratio of zirconia with respect to the metal oxide support is in a range of 50 mol % or higher and 95 mol % or lower, the $NO_x$ purification ratio realized by the resultant catalyst can be raised.

In order to allow the catalyst activity of rhodium to be exhibited sufficiently, it is more preferable that the metal oxide support prepared in step S1 contains zirconium in a range of 70 mol % or higher and 90 mol % or lower as being converted into an oxide. Namely, it is preferable that the ratio of zirconia with respect to the metal oxide support is in a range of 70 mol % or higher and 90 mol % or lower. When the ratio of zirconia with respect to the metal oxide support is in a range of 70 mol % or higher and 90 mol % or lower, the $NO_x$ purification ratio realized by the resultant catalyst can be further raised.

It is preferable that the metal oxide support prepared in step S1 contains at least one metal material selected from the group consisting of cerium (Ce), lanthanum (La) and neodymium (Nd). Namely, it is more preferable that the metal oxide support is a zirconia-based complex oxide than being formed only of zirconia.

When the metal oxide support contains cerium, the metal oxide support can absorb oxygen in the atmosphere. This raises the $NO_x$ purification ratio. When the metal oxide support contains lanthanum, the surface area of the complex oxide is increased. This raises the $NO_x$ purification ratio. When the metal oxide support contains neodymium, the aggregation of rhodium can be suppressed. This raises the $NO_x$ purification ratio.

It is preferable that the rhodium solution prepared in step S2 has an absorbance of 0.8 or less for a ray having a wavelength of 300 nm. According to the studies performed by the present inventors, when the absorbance for the ray having a wavelength of 300 nm is 0.8 or less, the degree of dispersion of rhodium can be increased than when the absorbance for the ray having a wavelength of 300 nm exceeds 0.8. A reason for this will be described in detail later.

It is preferable that the rhodium solution prepared in step S2 has a chlorine content of 1000 ppm or less. Chlorine causes the catalyst to be poisoned. Therefore, when the chlorine content of the rhodium solution exceeds 1000 ppm, a step of removing chlorine is required after rhodium is supported. By preparing a rhodium solution having a chlorine content of 1000 ppm or less, such a step becomes unnecessary. Thus, the production cost can be decreased and the time duration required for the production can be shortened.

According to the production method in this embodiment, the pH of the rhodium solution is adjusted to a range of 3.0 or higher and 7.5 or lower in step S4. Therefore, in the catalyst powder obtained in step S5, rhodium of a minute particle size can be supported on the metal oxide support at a high degree of dispersion. The degree of dispersion of rhodium is defined as a ratio of the number of rhodium atoms exposed to the surface with respect to the total number of rhodium atoms. The degree of dispersion of rhodium can be measured by, for example, a CO pulse method. In order to realize a sufficiently high level of purification performance, the degree of dispersion of rhodium in the catalyst powder is preferably 70% or higher, and more preferably 80% or higher.

Figure 2:
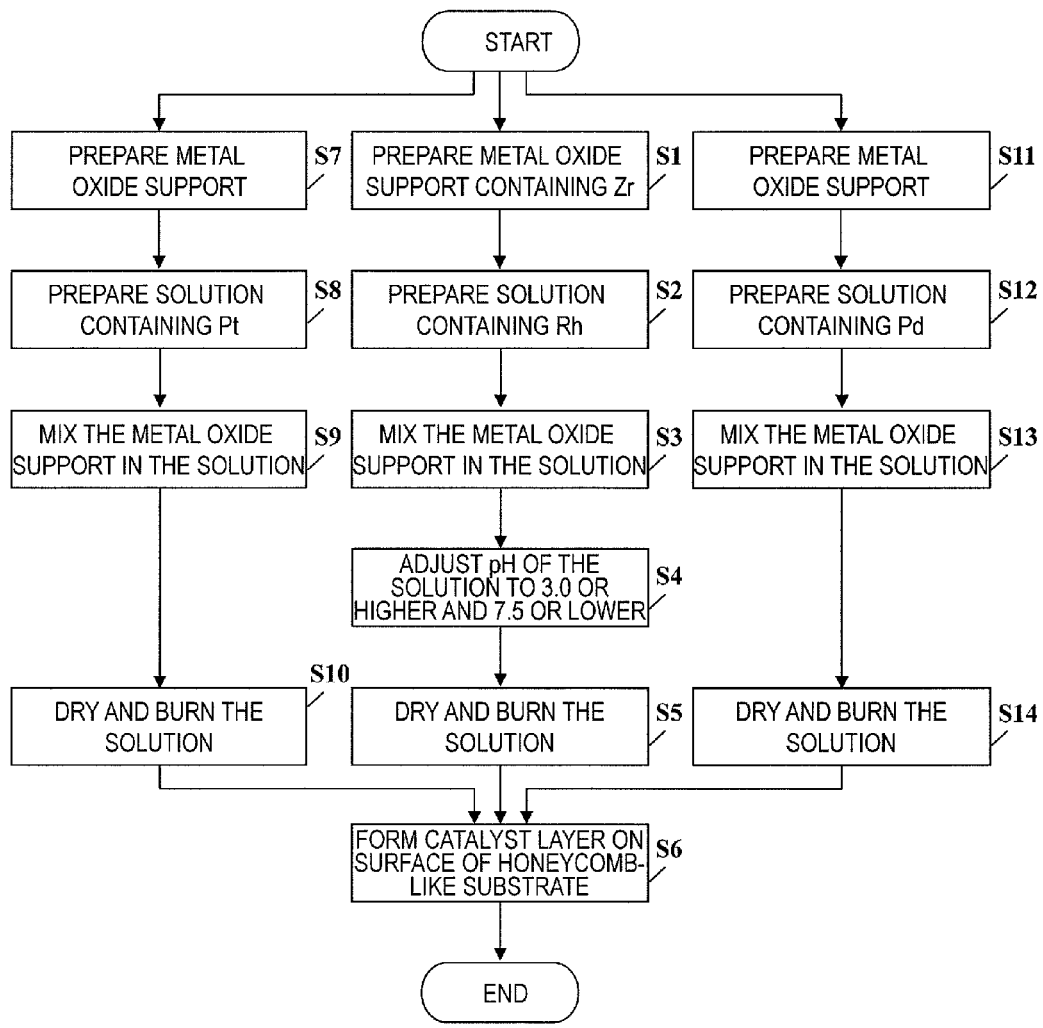
FIG. 2 is a flowchart of a method for producing an exhaust gas purifying catalyst in a preferable embodiment according to the present invention.

The production method shown in FIG. 1 uses only rhodium as the noble metal material. Alternatively, another noble metal material may be used in addition to rhodium. In order to purify all of CO, HC and $NO_x$ at a high efficiency, it is preferable to use platinum and palladium in addition to rhodium. FIG. 2 shows a flowchart of a production method using rhodium, platinum and palladium.

In this case, as shown in FIG. 2, separately from a series of steps S1 through S5 for obtaining catalyst powder containing a metal oxide support and rhodium supported thereon, a series of steps S7 through S10 for obtaining catalyst powder containing a metal oxide support and platinum supported thereon, and a series of steps S11 through S14 for obtaining catalyst powder containing a metal oxide support and palladium supported thereon are performed.

First, steps S7 through S10 for obtaining catalyst powder containing platinum will be described.

First, a metal oxide support is prepared (step S7). The metal oxide support prepared in step S7 is, for example, an alumina-based oxide or a ceria-based oxide.

Next, a solution containing platinum (platinum solution) is prepared (step S8). The platinum solution prepared in step S8 is typically an aqueous solution of a platinum salt. Examples of the aqueous solution of a platinum salt include an aqueous solution of dinitrodiammine platinum and an aqueous solution of hexaammine platinum. Step S7 and step S8 may be performed in any order.

Next, the metal oxide support is mixed in the platinum solution (step S9). Powder of the metal oxide support is added to the platinum solution, or the metal oxide support dispersed in water beforehand is added, together with water, to the platinum solution. Typically, after this process, the platinum solution is stirred by a stirrer or the like and then is left at a prescribed temperature for a prescribed time duration. As a result of step S9, platinum is adsorbed to the metal oxide support.

Next, the platinum solution is dried and burned (step S10). As a result, catalyst powder containing the metal oxide support and platinum supported thereon is obtained. The drying operation is performed, for example, at 120° C. for 300 minutes. The burning operation is performed, for example, at 600° C. for 60 minutes.

Next, steps S11 through S14 for obtaining catalyst powder containing palladium will be described.

First, a metal oxide support is prepared (step S11). The metal oxide support prepared in step S11 is, for example, an alumina-based oxide or a ceria-based oxide.

Next, a solution containing palladium (palladium solution) is prepared (step S12). The palladium solution prepared in step S12 is typically an aqueous solution of a palladium salt. Examples of the aqueous solution of a palladium salt include an aqueous solution of palladium nitrate and an aqueous solution of dinitrodiammine palladium. Step S11 and step S12 may be performed in any order.

Next, the metal oxide support is mixed in the palladium solution (step S13). Powder of the metal oxide support is added to the palladium solution, or the metal oxide support dispersed in water beforehand is added, together with water, to the palladium solution. Typically, after this process, the palladium solution is stirred by a stirrer or the like and then is left at a prescribed temperature for a prescribed time duration. As a result of step S13, palladium is adsorbed to the metal oxide support.

Next, the palladium solution is dried and burned (step S14). As a result, catalyst powder containing the metal oxide support and palladium supported thereon is obtained. The drying operation is performed, for example, at 120° C. for 300 minutes. The burning operation is performed, for example, at 600° C. for 60 minutes.

After the catalyst powder containing rhodium, the catalyst powder containing platinum, and the catalyst powder containing palladium are obtained as described above, these types of catalyst powder may be used to form a catalyst layer on a surface of a honeycomb-like substrate (step S6). For example, first, the catalyst powder containing rhodium, the catalyst powder containing platinum, the catalyst powder containing palladium, a binder and water are mixed together, and the resultant mixture is pulverized to form a slurry. In this process, another metal oxide (e.g., alumina) may be added to the mixture in order to stabilize the slurry. In the process of forming the slurry, it is preferable to adjust the pH of the slurry to a range of 3 to 5 for the reason described above. Next, the slurry is applied to the surface of the substrate, and then dried and burned. In this manner, an exhaust gas purifying catalyst containing rhodium, platinum and palladium as noble metal materials can be produced.

As already described, since the pH of the rhodium is adjusted to a range of 3.0 or higher and 7.5 or lower in step S4, the degree of adsorption of rhodium to the metal oxide support containing zirconium can be increased. Since ammonium carbonate, ammonium hydrogencarbonate or ammonia water is used in step S4 instead of a mere alkaline compound, the degree of dispersion of rhodium after the catalyst is exposed to a high temperature can be kept higher than in the case where any other alkaline compound is used. Hereinafter, results of inspection on these points will be described.

Figure 3:
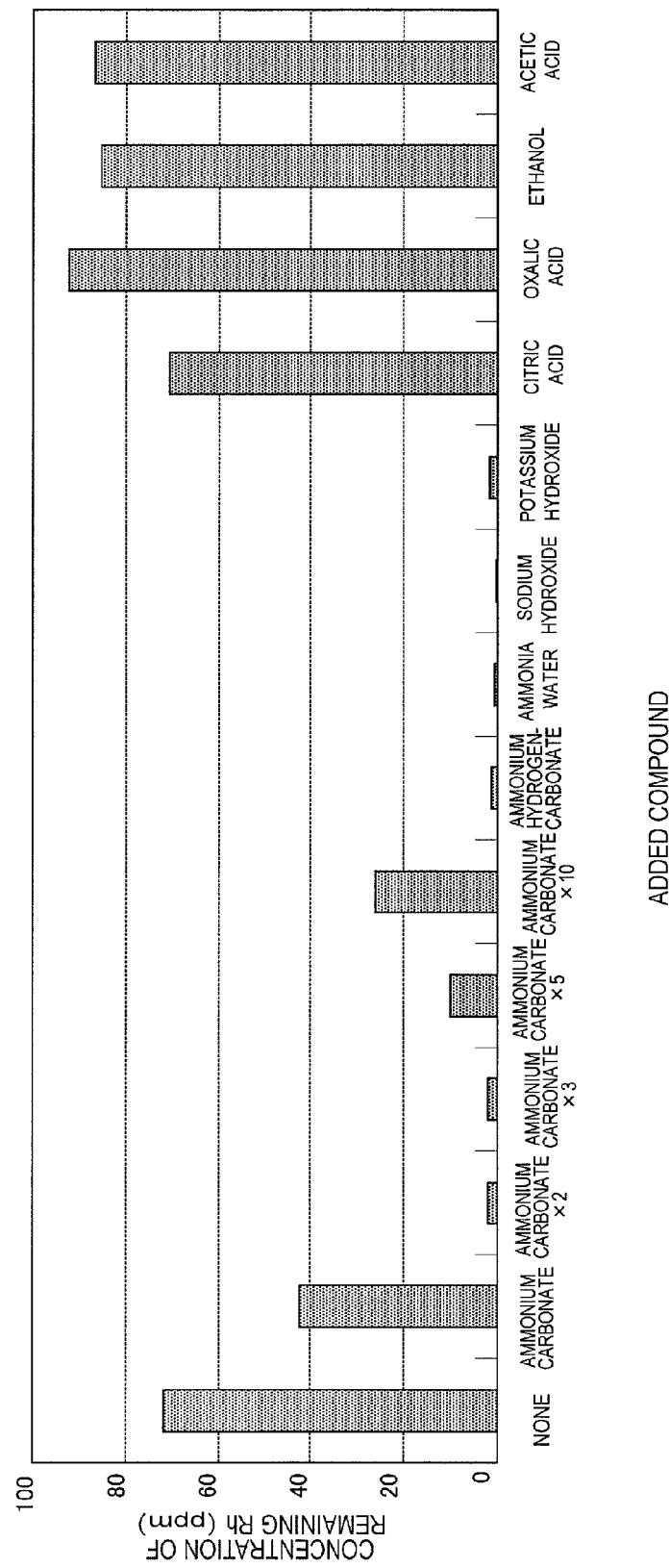
FIG. 3 is a graph showing the concentration of remaining rhodium when a metal oxide support is mixed in a rhodium solution and any of various compounds is added in a prescribed amount.

FIG. 3 shows the concentration of remaining rhodium (concentration of rhodium which is not adsorbed to the metal oxide support and remaining in the solution) when a metal oxide support is mixed in a rhodium solution and any of various compounds is added in a prescribed amount. Specifically, FIG. 3 shows the concentration of remaining rhodium when a zircoania-based complex oxide containing zirconia ($ZrO_2$) and ceria ($CeO_2$) as well as a small amount of lanthania ($La_2O_3$) and a small amount of neodymia ($Nd_2O_3$) was mixed in an aqueous solution of rhodium nitrate, then any of various compounds was added, and the resultant substance was left at 80° C. for 1 hour. The concentration of remaining rhodium was measured by ICP (inductively coupled plasma) emission analysis. Among the added compounds, ammonium carbonate was added in twice the amount, three times the amount, five times the amount, and ten times the amount (in the figure, represented as "×2", "×3", "×5", "×10", respectively).

As can be seen from FIG. 3, when an alkaline compound such as ammonium carbonate, ammonium hydrogencarbonate, ammonium water, sodium hydroxide, potassium hydroxide or the like is added, the concentration of remaining rhodium is lower than in the case where no such compound is added; namely, the amount of rhodium adsorbed to the metal oxide support is increased. By contrast, when an acidic compound such as citric acid, oxalic acid, ethanol, acetic acid or the like is added, the concentration of remaining rhodium is approximately equal to, or higher than, in the case where no such compound is added; namely, the amount of rhodium adsorbed to the metal oxide support is not changed almost at all or is decreased.

Figure 4:
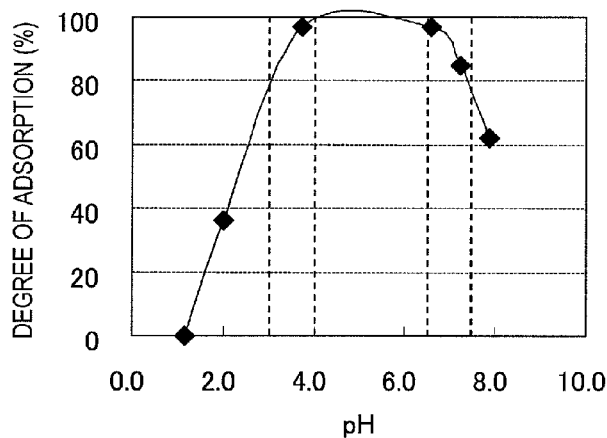
FIG. 4 is a graph showing the relationship between the pH of the rhodium solution in which the metal oxide support is mixed and the degree of adsorption of rhodium.

FIG. 4 shows the relationship between the pH of the rhodium solution in which the metal oxide support is mixed and the degree of adsorption of rhodium. Specifically, FIG. 4 shows the relationship between the pH and the degree of adsorption when the same zirconia-based complex oxide as shown in FIG. 3 was mixed in an aqueous solution of rhodium nitrate and kept at 80° C. The pH was adjusted by changing the amount of ammonium carbonate added to the solution. The degree of adsorption was calculated from the concentration of remaining rhodium.

When a zirconia-based complex oxide is merely mixed in a commercially available aqueous solution of rhodium nitrate (i.e., without pH adjustment), the pH is about 1.2. In this case, as can be seen from FIG. 4, almost no amount of rhodium is adsorbed to the metal oxide support. As disclosed in Patent Document 1, the solution could be evaporated to dryness so that rhodium is forcibly supported on the metal oxide support. However, when the solvent is evaporated in the state where rhodium is not adsorbed to the metal oxide support, rhodium aggregates in the process. This decreases the degree of dispersion.

By contrast, as can be seen from FIG. 4, when the pH is in a range of 3.0 or higher and 7.5 or lower, a degree of adsorption of about 80% or higher can be realized. Therefore, rhodium can be supported on the metal oxide support containing zirconium at a high degree of dispersion. As can be seen from FIG. 4, when the pH is in a range of 4.0 or higher and 6.5 or lower, a degree of adsorption of about 97% or higher can be realized. Therefore, rhodium can be supported on the metal oxide support containing zirconium at a higher degree of dispersion.

Figure 5:
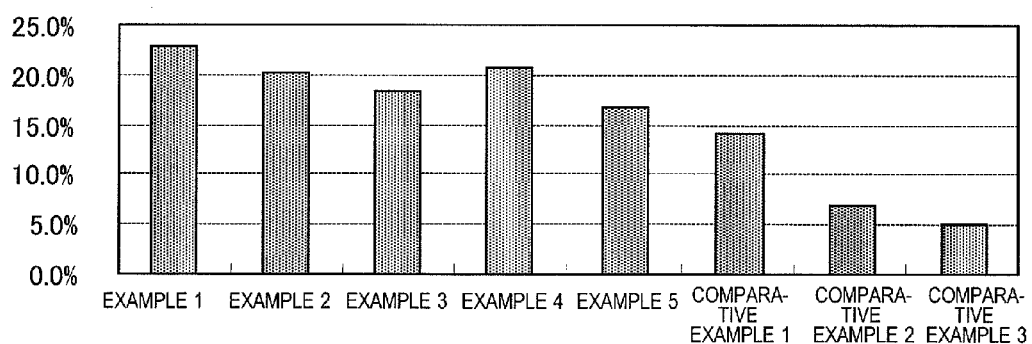
FIG. 5 is a graph showing the degree of dispersion of rhodium in the exhaust gas purifying catalysts in Examples 1 through 5 and Comparative examples 1 through 3, after high-temperature heating.

Table 1 shows the degree of dispersion of rhodium in an initial state and the degree of dispersion of rhodium after high-temperature heating (heating at 800° C. for five hours) in Examples 1 through 5 and Comparative examples 1 through 3. In Examples 1 through 5, ammonium carbonate, ammonium hydrogencarbonate or ammonia water was added as an alkaline compound to a rhodium solution in which the metal oxide support is mixed. In Comparative example 1, no alkaline compound was added. In Comparative examples 2 and 3, sodium hydroxide and potassium hydroxide were added as an alkaline compound respectively. Even in the initial state, the metal oxide support supporting rhodium has already been heated at 600° C. for 1 hour in the process of burning the slurry. The degree of dispersion was measured by a CO pulse method. Table 1 also shows the absorbance (Abs.) of the rhodium solution prepared in step S2 for the ray having a wavelength of 300 nm, and the ratio of zirconia (mol %) with respect to the metal oxide support prepared in step S1. The degree of dispersion of rhodium after at a high-temperature heating shown in Table 1 is shown in FIG. 5 in a graph.

through 4 for the ray having a wavelength of 300 nm is 0.2. By contrast, as can be seen from FIG. 6(b), the absorbance of the rhodium solution used in Example 5 for the ray having a wavelength of 300 nm is 1. As seen from a comparison of Examples 1 through 4 and Example 5 in Table 1, the degree of dispersion of rhodium can be higher when the absorbance of the rhodium solution prepared in step S2 for the ray having a wavelength of 300 nm is 0.8 or lower than when the absorbance exceeds 0.8. A conceivable reason why this occurs is that the state of rhodium ions in the solution influences the degree of dispersion.

Now, results of inspection on the relationship between the ratio of zirconia with respect to the metal oxide support prepared in step S1 (i.e., the ratio of zirconium as being converted into an oxide) and the $NO_x$ purification ratio realized by the resultant catalyst will be described.

Figure 7:
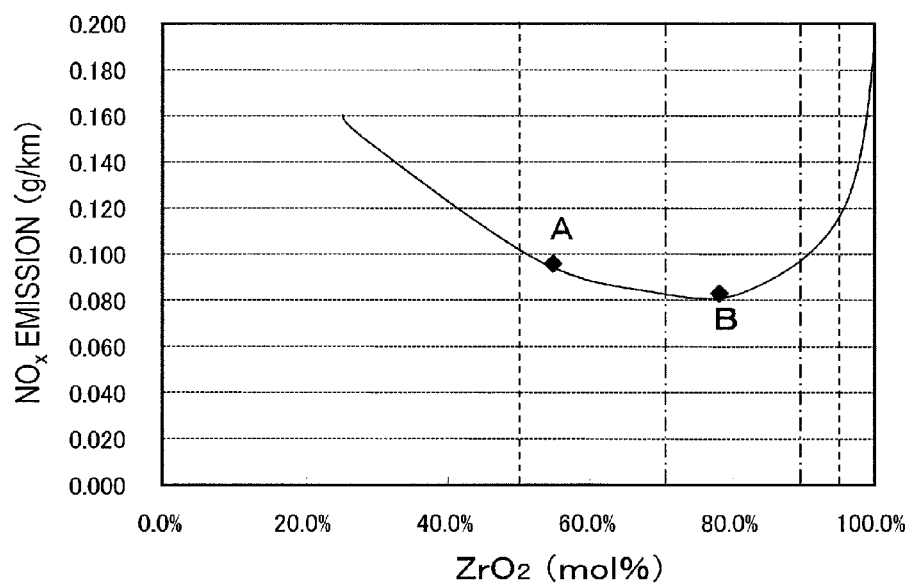
FIG. 7 is a graph showing the relationship between the ratio of zirconia (mol %) with respect to the metal oxide support and the $NO_x$ emission (g/km).

FIG. 7 shows the relationship between the ratio of zirconia (mol %) with respect to the metal oxide support and the $NO_x$ emission (g/km). The $NO_x$ emission was measured by use of a motorcycle having a displacement of 125 cc under the EU3

TABLE 1

| | Alkaline compound | Absorbance of Rh solution (wavelength: 300 nm) | $ZrO_2$ ratio with respect to metal oxide support (mol %) | Rh degree of dispersion (initial state) | Rh degree of dispersion (after heating at high temperature) |
|---|---|---|---|---|---|
| Ex. 1 | Ammonium carbonate | 0.2 | 80 | 79.2% | 22.9% |
| Ex. 2 | Ammonium hydrogen-carbonate | 0.2 | 80 | 81.1% | 20.3% |
| Ex. 3 | Ammonia water | 0.2 | 80 | 83.1% | 18.4% |
| Ex. 4 | Ammonium carbonate | 0.2 | 60 | 80.0% | 20.8% |
| Ex. 5 | Ammonium carbonate | 1 | 80 | 62.4% | 16.8% |
| Comparative ex. 1 | None | 0.2 | 80 | 50.1% | 14.0% |
| Comparative ex. 2 | Sodium hydroxide | 0.2 | 80 | 70.4% | 7.0% |
| Comparative ex. 3 | Potassium hydroxide | 0.2 | 80 | 71.5% | 5.2% |

As seen in Table 1, the degree of dispersion of rhodium in the initial state is higher in Examples 1 through 5 and Comparative examples 2 and 3 than in Comparative example 1. This occurs because the degree of adsorption of rhodium to the metal oxide support is increased by addition of an alkaline compound.

As shown in Table 1 and FIG. 5, the degree of dispersion of rhodium after high-temperature heating is higher in Examples 1 through 5 than in Comparative examples 1 through 3. This occurs because use of ammonium carbonate, ammonium hydrogencarbonate or ammonia water as an alkaline compound allows the degree of dispersion of rhodium to be kept high even if the catalyst is exposed to a high temperature. A conceivable reason why the degree of dispersion of rhodium is significantly decreased after high-temperature heating when sodium hydroxide or potassium hydroxide is used as an alkaline compound is that sodium or potassium reacts with the catalyst component at a high temperature.

Figure 6:
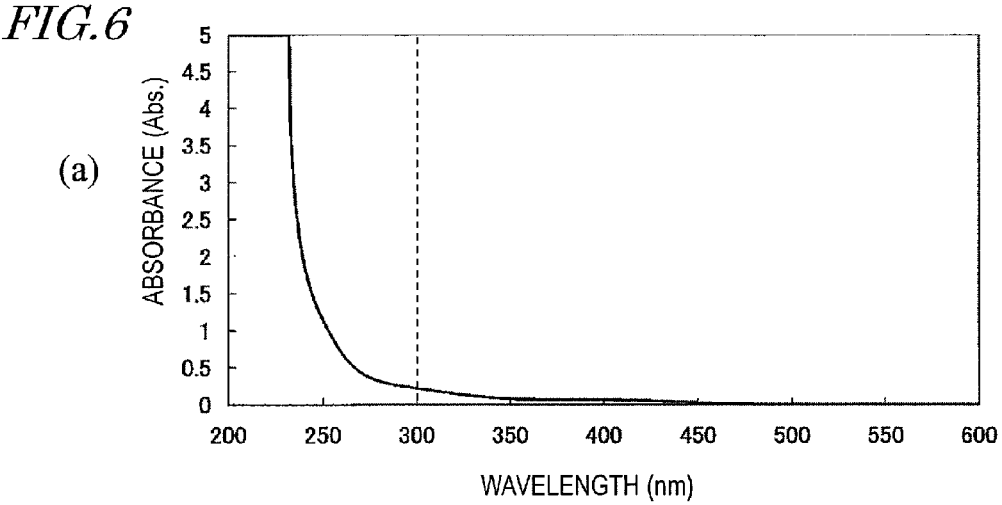
FIG. 6(a) is a graph showing the absorbance (Abs.) of the rhodium solution used in Examples 1 through 4.
FIG. 6(b) is a graph showing the absorbance (Abs.) of the rhodium solution used in Example 5.
Figure 6:
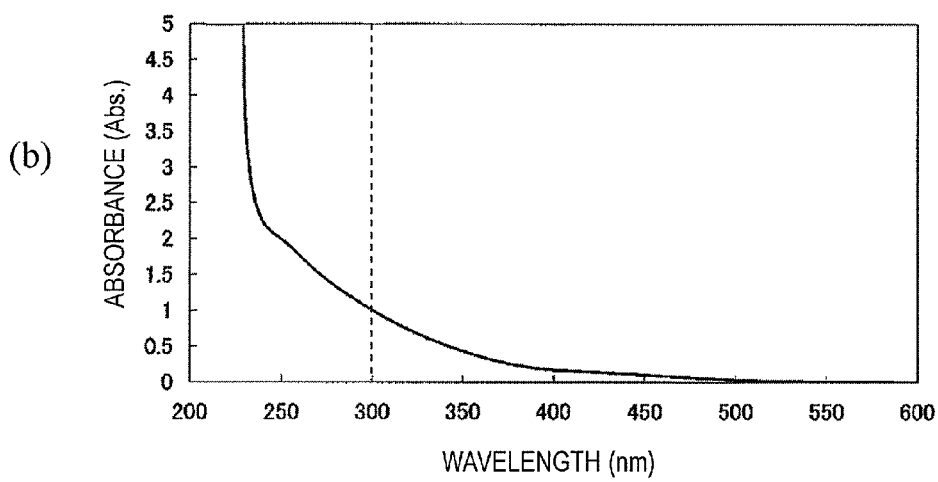

In Examples 1 through 4, and in Example 5, different rhodium solutions were used. FIG. 6(a) shows the absorbance (Abs.) of the rhodium solution used in Examples 1 through 4. FIG. 6(b) shows the absorbance (Abs.) of the rhodium solution used in Example 5. As can be seen from FIG. 6(a), the absorbance of the rhodium solution used in Examples 1 exhaust gas test conditions. Table 2 shows the chemical compositions of the metal oxide supports used at points A and B in FIG. 7. Table 3 shows the CO emission, THC emission and $NO_x$ emission at points A and B in FIG. 7.

TABLE 2

| | $ZrO_2$ | $CeO_2$ | $La_2O_3$ | $Nd_2O_3$ |
|---|---|---|---|---|
| A | 55 mol % | 39 mol % | 1 mol % | 5 mol % |
| B | 78 mol % | 16 mol % | 1 mol % | 5 mol % |

TABLE 3

| | CO emission (g/km) | THC emission (g/km) | $NO_x$ emission (g/km) |
|---|---|---|---|
| A | 0.975 | 0.123 | 0.096 |
| B | 0.968 | 0.114 | 0.083 |

It is understood from FIG. 7 that when the ratio of zirconia with respect to the metal oxide support is in a range of 50 mol % or higher and 95 mol % or lower, the $NO_x$ emission can be decreased and the $NO_x$ purification ratio can be raised. It is also understood from FIG. 7 that when the ratio of zirconia with respect to the metal oxide support is in a range of 70 mol % or higher and 90 mol % or lower, the $NO_x$ emission can be further decreased and the $NO_x$ purification ratio can be further raised. For example, comparing the two points A and B in FIG. 7, the $NO_x$ emission is smaller and the CO emission and the THC emission are also smaller at point B, at which the ratio of zirconia is 78.1 mol %, than at point A, at which the ratio of zirconia is 54.7 mol %.

Figure 8:
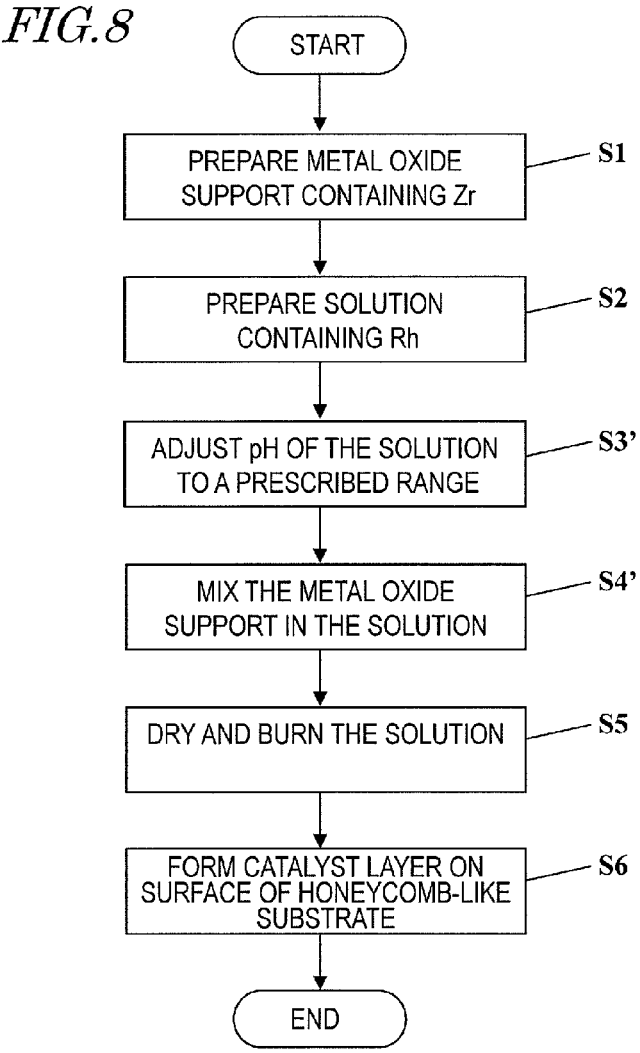
FIG. 8 is a flowchart of a method for producing an exhaust gas purifying catalyst in a preferable embodiment according to the present invention.

In the description given so far, the pH is adjusted after the metal oxide support is mixed in the rhodium solution. As shown in FIG. 8, the pH may be adjusted before the metal oxide support is mixed in the rhodium solution.

In the example shown in FIG. 8, first, a metal oxide support containing zirconium is prepared (step S1). Next, a rhodium solution is prepared (step S2). Step S1 and step S2 may be performed in any order.

Next, ammonium carbonate, ammonium hydrogencarbonate or ammonia water are added to the rhodium solution to adjust the pH of the rhodium solution to be in a prescribed range (step S3').

Next, the metal oxide support is mixed in the rhodium solution (step S4'). The prescribed range (range of pH of the rhodium solution) in step S3' is set such that the pH of the rhodium solution becomes a value in a range of 3.0 or higher and 7.5 or lower after step S4'. Namely, the pH is adjusted in step S3' in consideration that the pH is changed when the metal oxide support is mixed in the rhodium solution. Typically, the rhodium solution, after being mixed with the metal oxide support, is stirred by a stirrer or the like, and then left at a prescribed temperature (e.g., 60° C.) for a prescribed time duration (e.g., 1 to 5 hours). As a result of step S4', rhodium is adsorbed to the metal oxide support containing zirconium.

Next, the rhodium solution is dried and burned (step S5). Then, the resultant catalyst powder is used to form a catalyst layer on a surface of a honeycomb-like substrate (step S6).

As described above, the pH may be adjusted after the metal oxide support is mixed in the rhodium solution or before the metal oxide support is mixed in the rhodium solution. Namely, it is merely needed that after the metal oxide support and the rhodium solution are prepared, the step of adding the metal oxide support, as well as ammonium carbonate, ammonium hydrogencarbonate or ammonia water, to the rhodium solution to obtain the rhodium solution having a pH adjusted to a range of 3.0 or higher and 7.5 or lower is executed. This step may include steps S3 and S4 shown in FIG. 1 or step S3' and S4' shown in FIG. 8. Since the pH of the resultant rhodium solution is in a range of 3.0 or higher and 7.5 or lower, the degree of adsorption of rhodium to the metal oxide support containing zirconium can be increased.

When the pH is adjusted after the metal oxide support is mixed in the rhodium solution as shown in FIG. 1, there is an advantage that rhodium can be dispersed more uniformly. When the pH is adjusted before the metal oxide support is mixed in the rhodium solution, there is an advantage that a metal oxide support containing a component which is easily soluble in acid can be used.

An exhaust gas purifying catalyst produced by a production method in this embodiment provides a high level of purification performance and is highly durable, and therefore is preferably usable for various types of motor vehicles.

Figure 9:
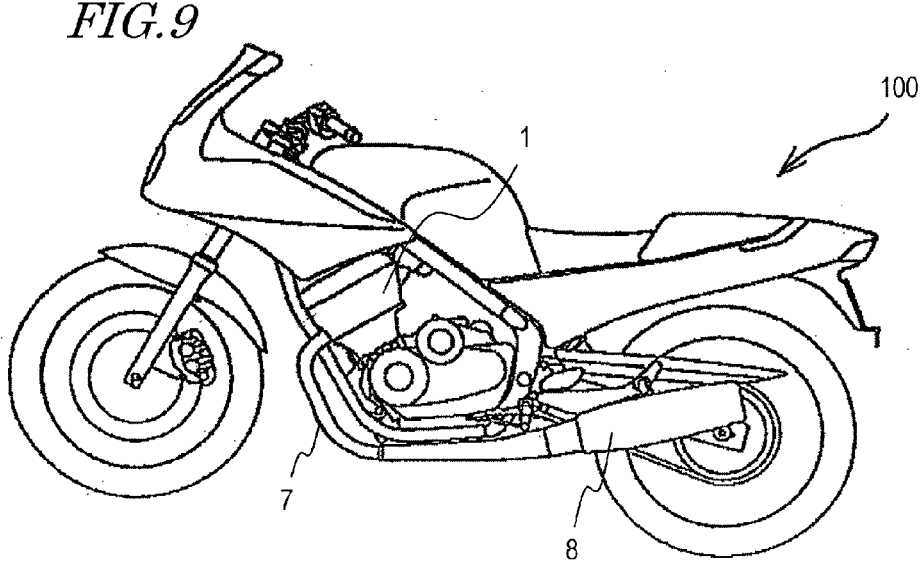
FIG. 9 is a side view schematically showing a motorcycle 100 including the exhaust gas purifying catalyst produced by the production method in a preferable embodiment according to the present invention.

FIG. 9 shows a motorcycle 100 including an exhaust gas purifying catalyst produced by a production method in this embodiment.

The motorcycle 100 includes an internal combustion engine 1, an exhaust pipe 7 connected to an exhaust port of the internal combustion engine 1, and a muffler 8 connected to the exhaust pipe 7. Exhaust gas from the internal combustion engine 1 is guided outside by the exhaust pipe 7. In the exhaust pipe 7, an exhaust gas purifying catalyst produced by the above-described production method is provided. The motorcycle 100 includes the exhaust gas purifying catalyst which provides a high level of purification performance and is highly durable, and therefore can decrease the emission of $NO_x$ or the like.

Herein, the motorcycle is shown as an example. The exhaust gas purifying catalyst produced by the production method in this embodiment is preferably usable for all types of vehicles, not only for motorcycles. For example, the exhaust gas purifying catalyst produced by the production method in this embodiment is usable for ATVs such as buggies.

INDUSTRIAL APPLICABILITY

The present invention can provide a method capable of producing an exhaust gas purifying catalyst including a metal oxide support containing zirconium and rhodium of a small particle size which is supported on the metal oxide support at a high degree of dispersion. The exhaust gas purifying catalyst produced by the production method according to the present invention is preferably usable for various types of motor vehicles such as motorcycles and the like.

REFERENCE SIGNS LIST

1 Internal combustion engine
7 Exhaust pipe
8 Muffler
100 Motorcycle

The invention claimed is:
1. A method for producing an exhaust gas purifying catalyst, comprising:
   step (a) of preparing a metal oxide support containing zirconium;
   step (b) of preparing a solution containing rhodium; and
   step (c) of adding the metal oxide support, and ammonium carbonate or ammonium hydrogencarbonate or ammonia water, to the solution to obtain the solution having a pH adjusted to a range of 3.0 or higher and 7.5 or lower; wherein
   either the step (c) includes:
      substep (c-1 A) of mixing the metal oxide support in the solution; and
      substep (c-2 A) of adding ammonium carbonate, ammonium hydrogencarbonate or ammonia water to the solution containing the rhodium after the substep (c-1 A) to adjust the pH of the solution to a range of 3.0 or higher and 7.5 or lower;
   or the step (c) includes:
      substep (c-1 B) of adding ammonium carbonate, ammonium hydrogencarbonate or ammonia water to the solution containing the rhodium to adjust the pH of the solution to a prescribed range; and
      substep (c-2 B) of mixing the metal oxide support in the solution after the substep (c-1 B); wherein
      the prescribed range in the substep (c-1 B) is set such that the pH of the solution becomes a value in a range of 3.0 or higher and 7.5 or lower after the substep (c-2 B) is performed.

2. The method for producing an exhaust gas purifying catalyst of claim 1, wherein the pH of the solution obtained in the step (c) is in a range of 4.0 or higher and 6.5 or lower.

3. The method for producing an exhaust gas purifying catalyst of claim 1, wherein the metal oxide support prepared in the step (a) contains zirconium in a range of 50 mol % or higher and 95 mol % or lower as being converted into an oxide.

4. The method for producing an exhaust gas purifying catalyst of claim 3, wherein the metal oxide support prepared in the step (a) contains zirconium in a range of 70 mol % or higher and 90 mol % or lower as being converted into an oxide.

5. The method for producing an exhaust gas purifying catalyst of claim 1, wherein the metal oxide support prepared in the step (a) contains at least one metal material selected from the group consisting of cerium, lanthanum and neodymium.

6. The method for producing an exhaust gas purifying catalyst of claim 1, wherein the solution prepared in the step (b) has an absorbance of 0.8 or less for a ray having a wavelength of 300 nm.

7. The method for producing an exhaust gas purifying catalyst of claim 1, wherein the solution prepared in the step (b) has a chlorine content of 1000 ppm or less.

8. The method for producing an exhaust gas purifying catalyst of claim 1, further comprising step (d) of drying and burning the solution after the step (c) to obtain catalyst powder containing the metal oxide support and rhodium supported thereon.

9. The method for producing an exhaust gas purifying catalyst of claim 8, further comprising step (e) of forming a catalyst layer by use of the catalyst powder on a surface of a honeycomb-like substrate.

10. A motor vehicle, comprising:

an internal combustion engine;

an exhaust pipe for guiding exhaust gas from the internal combustion engine to outside; and the exhaust gas purifying catalyst produced by the method for producing an exhaust gas purifying catalyst of claim 1 and provided in the exhaust pipe.

\* \* \* \* \*